United States Patent [19]

Hardange et al.

[11] Patent Number: 5,247,306

[45] Date of Patent: Sep. 21, 1993

[54] MILLIMETRIC WAVE RADAR SYSTEM FOR THE GUIDANCE OF MOBILE GROUND ROBOT

[75] Inventors: Jean-Philippe Hardange, Gif sur Yvette; Anne Petitdidier, Boulogne, both of France

[73] Assignee: Thomson-CSF, Puteaux, France

[21] Appl. No.: 785,277

[22] Filed: Oct. 30, 1991

[30] Foreign Application Priority Data

Nov. 9, 1990 [FR] France ................ 90 13944

[51] Int. Cl.$^5$ .................................. G01S 7/34
[52] U.S. Cl. ...................... 342/70; 342/92
[58] Field of Search ................ 342/69, 70, 71, 72, 342/92, 95

[56] References Cited

U.S. PATENT DOCUMENTS

| | | | |
|---|---|---|---|
| 3,680,085 | 7/1972 | Del Signore | 342/128 |
| 4,200,922 | 4/1980 | Hagemann | 367/96 |
| 4,213,126 | 7/1980 | Mulder et al. | 342/36 |
| 4,370,652 | 1/1983 | Lucchi | 342/101 |
| 4,451,909 | 5/1984 | Kodera et al. | 367/99 |
| 4,600,924 | 7/1986 | Lobsinger et al. | 342/98 |
| 4,675,684 | 6/1987 | Spence | 342/394 |
| 4,698,775 | 10/1987 | Koch et al. | 364/478 |
| 4,773,298 | 9/1988 | Tischer et al. | 89/1.13 |
| 4,846,297 | 7/1989 | Field et al. | 180/169 |
| 4,876,554 | 10/1989 | Tubbs | 343/780 |
| 4,932,831 | 6/1990 | White et al. | 414/732 |
| 4,984,745 | 1/1991 | Akeel et al. | 239/587 |
| 4,991,509 | 2/1991 | Smith | 102/213 |
| 4,996,468 | 2/1991 | Field et al. | 318/587 |
| 5,045,856 | 9/1991 | Paoletti | 342/70 |
| 5,075,853 | 12/1991 | Luke, Jr. | 364/424.02 |
| 5,083,130 | 1/1992 | Cardiasmenos | 342/188 |

FOREIGN PATENT DOCUMENTS

0139292 2/1985 European Pat. Off. .
2053516 2/1981 United Kingdom .

OTHER PUBLICATIONS

M. Lange "94 GHz Imaging Radar for Autonomous Vehicles" Conference Proceedings of The '83 European Microwave Conference Sep. 12-18, 1988, pp. 826-830.

*Primary Examiner*—John B. Sotomayor
*Attorney, Agent, or Firm*—Roland Plottel

[57] ABSTRACT

The disclosure relates to guidance devices on board autonomous vehicles or robots which have to move about notably in environments that are inaccessible or dangerous to human beings. Disclosed is a device for the detection of the environment, and the positioning and/or the guidance of a mobile vehicle on the ground, of the type comprising, firstly, means for the generation and transmission of a signal that can be reflected by a fixed obstacle and, secondly, means for the reception and processing of the signal reflected by said fixed obstacle, said processing means enabling the recognition of the environment and/or the guidance of said autonomous mobile vehicle, said transmitted signal being a millimetric wave radar signal and said transmission and reception means cooperating with a rotary antenna having a 360° rotation in azimuth.

17 Claims, 4 Drawing Sheets

MILLIMETRIC WAVE RADAR SYSTEM FOR THE GUIDANCE OF MOBILE GROUND ROBOT

BACKGROUND OF THE INVENTION

1. Field of the Invention

The field of the invention is that of guidance devices placed on board autonomous vehicles or robots, notably of the type that have to move about in environments that are inaccessible or dangerous to human beings.

If the environment in which the robot is moving is encumbered with obstacles, then the robot has to be provided with equipment for the acquisition, in real time or almost in real time, of information relating to this environment. This information may be either 2D or 3D information and enables the robot to explore and recognize its environment, move about in avoiding obstacles and plan its path.

2. Description of the Prior Art

There are known optical (video) type or acoustic type sensors fitted to autonomous robots. These sensors enable the acquisition of data relating to the environment in which the robots are moving.

Such sensors may consist, for example, of telemetrical lasers, acoustic or infra-red proximity or anti-collision systems, TRIDENT (protected name) type positioning systems using beacons, GPS (protected name) type positioning systems using satellites.

Video and acoustic sensors have the advantage of being low-cost devices that take up very little space, have excellent angular resolution and transmit data to the robot at a high bit rate. Good angular resolution makes it possible for a processing system associated with the video or acoustic sensors to locate distant objects as well as near but small objects.

However, video sensors and acoustic sensors both have limitations that bar their use on mobile ground robots.

Thus the performance characteristics of video sensors have the drawback wherein the measurements made are dependent on weather and environmental conditions. In particular, the qualities of the video sensors deteriorate in the presence of dust clouds or, again, the reliability of the data sent differs notably, depending on whether these video sensors are used by day or by night (i.e. through infra-red video sensors).

Furthermore whereas, in clear weather, the data transmitted by the optical sensors undergoes identical atmospheric attenuation (of the order of 0.2 dB/km) by day or by night (with infra-red sensing), in foggy weather this atmospheric variation is very different depending on the type of optical sensor used:

| daytime sensor: | attenuation = 150 dB/km |
| nighttime sensor: | attenuation = 100 dB/km |

Optical sensors thus have the drawback wherein they are incapable of being used outdoors in all weather since their characteristics are excessively dependent on atmospheric conditions and on the environment in which they are used.

Another drawback of video sensors is that they do not display conformity with maps of the ground. Thus, such sensors cannot be used to explore an already explored zone.

The major drawback of passive and active acoustic sensors, for their part, is that they have very limited possibilities of analysis in distance, so much so that they cannot be used to locate objects or obstacles at a great distance.

Finally, both video sensors and acoustic sensors as such are incapable of carrying out environmental recognition operations, for example in relation to an onboard map. To do so, they have to be associated with shape recognition algorithms. Now, this type of function calls for substantial and bulky computing means which are hardly compatible with the compactness and mobility required in onboard applications.

SUMMARY OF THE INVENTION

It is an aim of the present invention notably to overcome these drawbacks of the prior art.

More precisely, a first aim of the invention is to provide an environment detection device that has all the special functions adapted to a robot moving on the ground. In this respect, one aim of the invention is to provide means capable of detecting obstacles in the immediate vicinity of the robot (notably, the surface and the surface uneven features of the track on which the robot is moving) by a vision that is almost tangential to the plane of movement.

A complementary aim of the present invention is to provide a device such as this enabling 360° vision which is imperative for a robot on the ground.

Another aim of the present invention is to provide a device such as this having a great range.

An additional aim of the present invention is to provide a device such as this compatible with the requirements of compactness and mobility of a small-sized robot.

A complementary aim of the invention is that such a device should provide information on the environment in which the robot is moving, said information being provided in two dimensions (distance, circularity) or three dimensions (distance, circularity, elevation).

Another aim of the present invention is to provide a device such as this having simultaneously, on the one hand, a resolution in distance that is independent of the distance at which an obstacle is detected and, on the other hand, a small blind distance (the blind distance being the distance within which the detection devices are incapable of detecting an obstacle efficiently).

A complementary aim of the present invention is to provide a detection device such as this associated with powerful image processing algorithms enabling a resetting of the positional information coming from the radar.

An additional aim of the present information is to provide a device such as this working with low power signals so as to limit the consumption of the robot.

Another aim of the present invention is to provide a device such as this mounted on a robot, the movement of which can be remote controlled.

These aims, as well as others that shall appear here below, are achieved by means of a device for the detection of the environment, and the positioning and/or the guidance of a mobile vehicle on the ground, of the type comprising, firstly, means for the generation and transmission of a signal that can be reflected by a fixed obstacle and, secondly, means for the reception and processing of the signal reflected by said fixed obstacle, said processing means enabling the recognition of the environment and/or the guidance of said autonomous mobile vehicle, said transmitted signal being a millimetric wave radar signal and said transmission and reception means cooperating with a rotary antenna having a 360° rotation in azimuth.

Advantageously, said millimetric wave radar signal is a frequency modulated continuous microwave signal (using the FM-CW system).

Thus, an essential characteristic of the invention lies in the use of a W band millimetric wave radar instead of the optical and infra-red sensors that have been essentially used up till now. The wavelength of the signals transmitted and received is thus between 3 mm and 9 mm. The transmission/reception of signals in W band notably has the advantage of having atmospheric attenuation that is constant (0.2 dB/km) whether in clear weather or in foggy weather.

The originality of the invention lies in the novel field of application of radars (to ground robots) and in the necessary corresponding applications. In a standard way, especially when used in airborne applications, radars have the function rather of detecting distant and large obstacles and not small nearby obstacles. Besides, a large blind distance is generally tolerated in standard applications, and the field of vision is a small field, more usually limited to an angle of aperture of a few degrees around the path line.

Preferably, said reception means include gain correction means enabling the simultaneous detection of nearby obstacles and distant obstacles.

Advantageously, said gain correction means are analog means placed upline from an analog/digital converter.

Preferably, said gain correction means comprise a first subtractor receiving, firstly, a signal from said reception means and, secondly, this same signal delayed by a period of time equal to the sampling period of said analog/digital converter, a second subtractor receiving, firstly, the output signal from said first subtractor and, secondly, this same signal delayed by a time equal to said sampling period of said analog/digital converter, the output of said second subtractor supplying said analog/digital converter.

Preferably, said rotary antenna device is constituted by two antennas, with an aperture in elevation of about 10° and an aperture in azimuth of about 1.5°.

Advantageously, said antennas are of the pillbox type, fixed one on top of the other to prevent transmission leakages.

Preferably, said rotary antenna device is fixed on a plane located as high as possible on said autonomous mobile vehicle, notably on a telescopic arm.

According to a preferred embodiment of the present invention, said processing means are extra-vehicular, i.e. placed at a distance from said mobile vehicle, and communicate with said vehicle by radio link.

In this way, the requirements of compactness and mobility of the robot are made compatible with the high computing capacity needed for the environment recognition and guidance functions.

Advantageously, said reflected signal is memorized and transmitted to said processing means after each complete revolution of said rotary antenna device.

Preferably, said processing means include means that deliver a map of the environment in which the autonomous mobile vehicle is located in giving a signal for each point of the environment observed, the level of this signal representing the radar equivalent surface of the terrain or of the objects located at this point.

Advantageously, said processing means use image processing algorithms enabling the display of the data elements coming from said autonomous mobile vehicle on a display screen in the form of a 2D or 3D scene.

Preferably, said image processing algorithms carry out a resetting of the image transmitted by said autonomous mobile vehicle with a previously recorded image or with a geographical map.

Advantageously, said autonomous mobile vehicle is remote controlled by radio link.

Preferably, said autonomous mobile ground vehicle is an all-terrain robot fitted out with wheels and/or tracks.

A configuration such as this enables the use of the autonomous mobile ground vehicle outdoors and on uneven terrains.

BRIEF DESCRIPTION OF THE DRAWINGS

Other features and advantages of the present invention shall appear from the following description of a preferred embodiment of the invention, given by way of a non-restrictive explanation, and from the appended drawings, of which.

DETAILED DESCRIPTION OF THE INVENTION

Figure 1A:
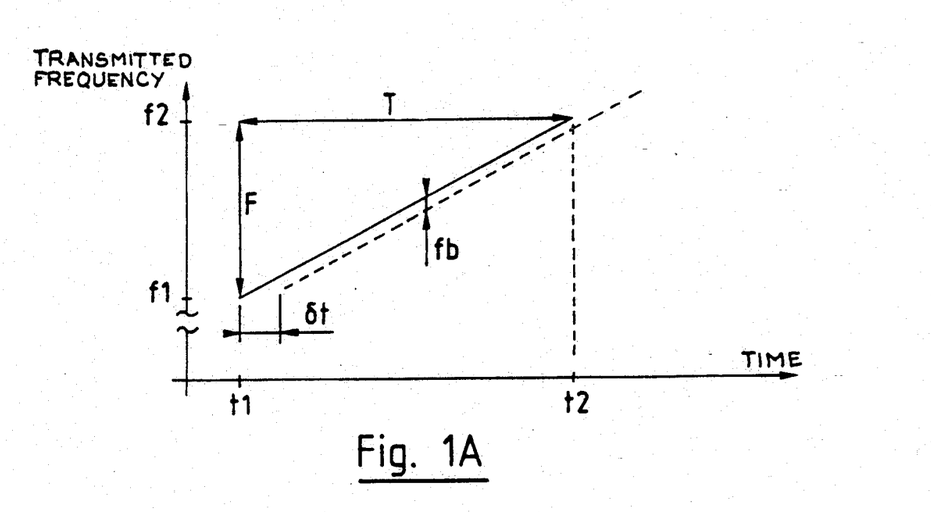
FIGS. 1A, 1B, 1C represent the principle of an FM-CW radar implemented in the present invention.
Figure 1B:
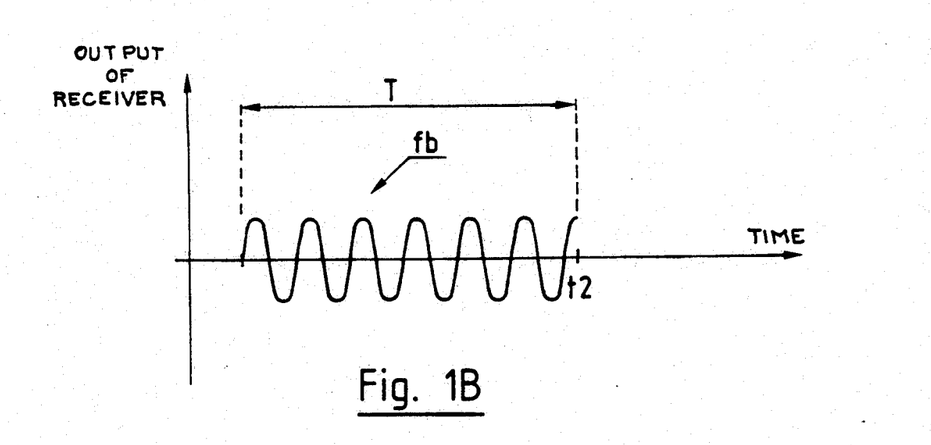
Figure 1C:
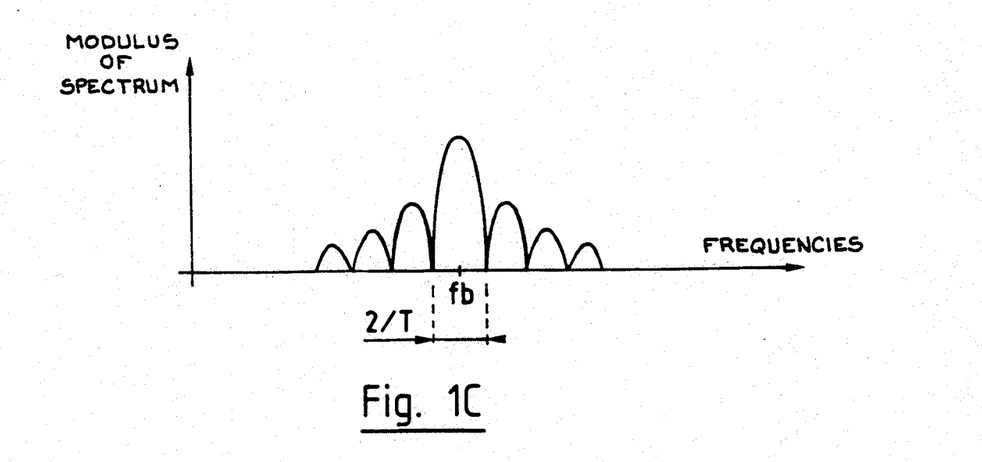

FIGS. 1A, 1B and 1C show the principle of an FM-CW radar system implemented in the present invention.

An FM-CW radar system comprises an antenna for the transmission of a microwave signal designed to be reflected by an obstacle. The transmitted signal is a frequency modulated continuous wave. The reflected signal is picked up by a reception antenna. When the wave is reflected by an obstacle, the processing system will measure the period of time taken by the microwave to return to the reception antenna. During this period of time, the frequency of the transmitted signal changes, so much so that, at the instant of reception, the signals received and transmitted have different frequencies. This difference in frequency is called the beat frequency. Since the beat frequency depends on the path time of the microwave, it depends on the distance of the obstacle.

FIG. 1A represents this principle. The transmitted microwave undergoes linear frequency modulation between two frequencies $f_1$ and $f_2$. The frequency excursion of the transmitted signal is equal to F. The modulation signal has a frequency $f_1$ at a time $t_1$ and reaches the frequency $f_2$ at a time $t^1$. The period of modulation is therefore equal to $T = t_2 - t_1$.

The transmitted signal is shown in a solid line. If the signal encounters an obstacle, it is reflected towards a reception antenna where it arrives with a time lag δt (shown in dashes). In the meantime, the frequency of the modulation signal has increased by $f_b$. If the modulation frequency excursion F is great in comparison with the modulation period T, the beat frequency $f_b$ remains constant during the time T−δt. By injecting the transmitted signal and the reflected signal into a mixer and by eliminating the high frequency signal, for example by means of a low-pass filter, the beat frequency $f_b$ shown in FIG. 1B is obtained. The beat frequency $f_b$ is proportional to the distance R between the radar system and the obstacle.

$$f_b = F \cdot \delta t / T = 2 \cdot F \cdot R / (c \cdot T)$$

where c is the speed of light ($=3.10^8$ m/s).

The beat frequency $f_b$ is therefore all the greater as the reflecting obstacle is distant.

In order to make a precise measurement of the distance of the obstacle, it is necessary to derive the beat signal of FIG. 1B. To this end, a fast Fourier transform (FFT) may be applied to the beat signal.

FIG. 1C shows the amplitude of the mixed and then filtered signal in the frequency domain. The spectrum is centered on the frequency $f_b$, and the frequency band without the harmonics is equal to 2/T.

According to the Nyquist criterion, the maximum beat frequency $f_{bmax}$ is equal to $0.5 \cdot f_e$, where $f_e$ is the sampling frequency. The maximum distance $R_{max}$ at which an obstacle may be detected is therefore given by:

$$R_{max} = c \cdot T \cdot f_{bmax}/(2 \cdot F)$$
$$= N \cdot c/(4 \cdot F)$$

where N is the number of samples taken during the period T.

The resolution r of the radar system is then given by:

$$r = c/(2 \cdot F) \tag{1}$$

The resolution of the radar system is therefore inversely proportional to the frequency excursion of the modulation signal.

To use an FM-CW type radar in the specific application of the invention, namely for the guidance of a robot on the ground, the inventors have followed a specific parametrization. This parametrization may be defined, for example, by difference with respect to the parameters of airborne radars, also called standard mapping radars.

Standard mapping radars have the drawback of having a blind distance proportional to the duration of the pulses sent by their transmission/reception antennas. For, if the start of a sent pulse (for example the leading edge of the pulse) is reflected, notably by a nearby obstacle, and received by the transmission/reception antenna before the end of the pulse (in this case the trailing edge of the pulse) has been sent, the pulse radar can no longer detect this obstacle accurately. This is why the pulses sent should be very brief pulses, in order to limit the blind distance to the maximum extent. However, this duration cannot be diminished as much as desired, firstly for technological reasons and, secondly, because it is important to have a mean pulse power that is sufficient to enable the detection of more distant obstacles. For, if the mean power of a pulse diminishes, the signal-to-noise ratio diminishes, and it is no longer possible to detect distant obstacles, with the background noise masking the echo.

The present invention proposes, on the contrary, to use a millimetric wave that is linearly modulated in frequency (on the FM-CW principle). The blind distance is thereby considerably reduced since it depends on a frequency excursion F of the order of 75 MHz according to a preferred embodiment of the present invention.

Furthermore, according to the invention, the aperture of the antennas in azimuth and in elevation is optimized so that the robot moving on the ground has very precise vision in a plane parallel to its plane of movement as well as all around it (360°).

In order to enable the guidance of a mobile robot, it is necessary to have two functions available: a steering function and a positioning function.

The steering function calls for the supply of an image of a zone of the ground with a renewal rate and an explored field that are compatible with the speed of movement of the robot and the reaction time of the pilot.

The positioning function requires the supply of an image of the zone of the ground that is geometrically in conformity with (i.e. one that corresponds to) a previously recorded image or to a geographical map, positioned precisely with respect to the robot. This image has to be big enough to contain the landmarks needed for obtaining the requisite resetting precision, the landmarks being defined as obstacles that project out of the horizon and can be avoided or located.

These two functions are fulfilled, according to the present invention, by means of a guidance and positioning device that includes, firstly, a radar device mounted on a mobile robot moving on the ground and, secondly, processing means that provide simultaneously for the processing and display of the radar signals as well as the positioning of the mobile autonomous robot.

The positioning principle implements automatic resetting devices. These devices are of the type used in the field of airborne radars to enable navigation, i.e. to ascertain the position of the aircraft at each instant. The working principle of airborne radars is based on the transmission and reception of brief pulses, generally in the centimeter wave range (frequencies of more than 5 GHz). The recognition of a site or an environment is achieved by means of image processing algorithms, essentially algorithms for the correlation of information received by the radar with a geographic map or with another previously recorded radar map. By comparing the two images, these algorithms indicate whether there has been translation and/or rotation of a map with respect to the other and thus enable repositioning. This repositioning or, again, this resetting is done at close time intervals which may or may not be regular. The gap between two resettings depends on the system and may vary from 50 ms to 15 minutes approximately.

The main advantage of mapping radars is the conformity of the observed zone with the previously recorded zone. Furthermore, these radars make use of very elaborate image processing algorithms, providing for a very precise resetting of the exact position of the aircraft with respect to its environment.

However, the processing means using these algorithms are very substantially sized and the space that they occupy does not lend itself to assembly on a mobile ground vehicle capable of moving easily while at the same time avoiding obstacles.

This is why, according to the invention, the processing means preferably communicate with the radar device by radio link and are extra-vehicular (i.e. placed apart at a site that may be very far from the robot).

The fact of making the processing means extra-vehicular enables the implementation of bulky processing means which could not be mounted on the robot (such as means for the resetting algorithms, memories containing data relating to an already known environment, etc.).

Figure 2:
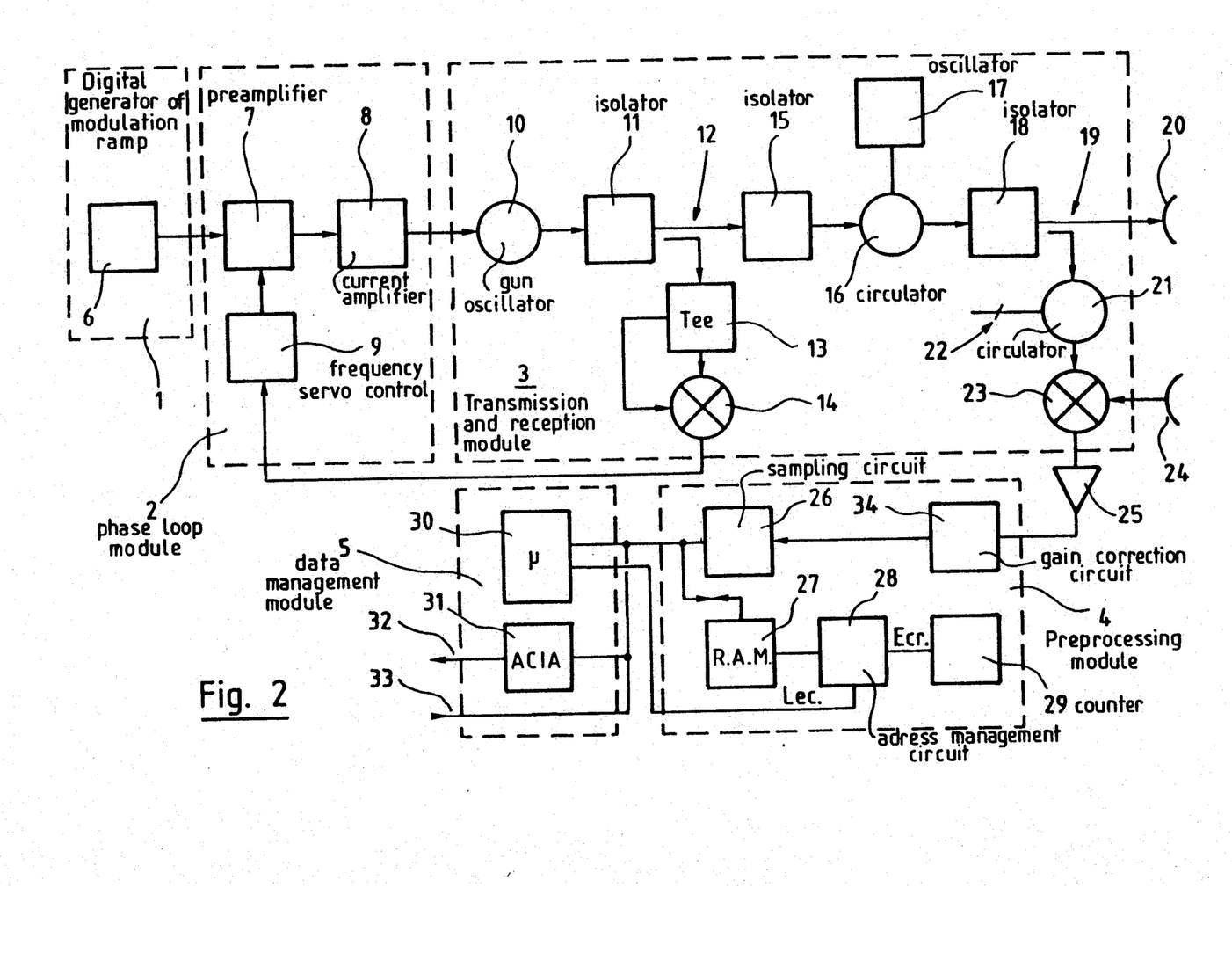
FIG. 2 shows a block diagram of a part of the guidance device according to the invention, designed to be placed on board an autonomous vehicle.

FIG. 2 shows a block diagram of a part of the guidance device according to the invention, designed to be placed aboard an autonomous vehicle.

The onboard part shown rotates on itself at a speed of 0.1 rotation per second and, by radio link, it transmits the data on the obstacles that it encounters to the extra-vehicular part located in a shelter or room. According to the invention, the maximum bit rate of the radio link is in the range of 500 kBauds. The extra-vehicular part memorizes the data and then carries out the processing in deferred mode, and gives a depiction of the zone observed on a monitor. Naturally, other applications are possible and it is notably possible to provide interfaces with the exterior.

FIG. 2 shows five modules 1, 2, 3, 4 and 5 for the generation and pre-processing of the signals transmitted and received respectively by antennas 20 and 24.

The module 1 is constituted by a digital generator 6 of a modulation ramp of the sinusoidal signal transmitted. The resolution in distance depends on the bandwidth of the signal transmitted (relationship 1). According to one embodiment of the invention, the bandwidth is equal to 75 MHz, which corresponds to a resolution in distance of two meters. Naturally, the bandwidth can be increased or diminished, depending on the resolution sought. The ramp is given to the analog phase loop module 2 that generates a frequency modulation ramp for a Gunn oscillator 10, the servo-control of this ramp and the control of the Gunn oscillator. The bandwidth of the modulated signal transmitted depends on the desired resolution in distance (relationship (1)). The module 2 thus has a servo-control preamplifier 7, a current amplifier 8 for the control of the Gunn oscillator 10 and a return loop comprising a frequency servo-control system 9.

The module 3 is constituted by a transmission/reception stage located in a thermostat-controlled chamber. The microwave elements constituting this module work in W band and are linked to one another by millimetrical waveguides. The module 3 includes the Gunn oscillator 10, constituted for example by a Gunn diode, followed by a set of isolators 11, 15 separated by a coupler 12. The coupler 12 enables a looping of the microwave signal to the module 2, through a 3 dB Tee 13 and a mixer 14. The output of the isolator 15 is connected to a circulator 16, connected firstly to an oscillator element 17 formed by a supplied IMPATT diode and, secondly, to an isolator 18. The output of the isolator 18 is connected to a transmission antenna 20. The antenna 20 transmits a microwave that is a carrier of the frequency modulated sinusoidal signal. A part of the signal coming out of the isolator 18 is picked up by a coupler 19 and goes into a circulator 21 comprising an adjustable short-circuit 22. The signal coming out of the circulator 21 enters a mixer 23 that is also connected to the reception antenna 24 for the reception of the signal reflected by an obstacle. The mixer 23 carries out the mixing between the frequency ramp transmitted and the signal received. The signal coming from the mixer 23 is amplified by a video preamplifier 25 and given to a first pre-processing module 4.

The pre-processing module 4 is an encoding module comprising a gain correction circuit 34, the function of which shall be explained hereinafter, a 1 MHz sampling circuit 26 (12 encoding bits), a RAM 27 for memorizing the radar signal, an address management circuit 28 and a write counter 29. The encoding module 4 communicates with the module 5 providing for the management of the data. This module has an eight-bit microprocessor 30 which communicates with the RAM 27 and the address management circuit 28 and an ACIA (Asynchronous Communication Interface Adaptor) 31. The module 5 notably provides for the transfer of radar data towards the extra-vehicular part, at a maximum bit rate of 500 kBauds, by means of the radio link 32.

The transmission of data between the robot comprising the radar and the extra-vehicular part can also be done by cable or optical fiber. The nature of this data transmission has no influence on the radar, beyond the data management module 5.

The conditioning of the onboard part is provided by conduction on the metal walls of a box enclosing the various elements described, with a ventilator stirring the air inside the chamber.

The supplies providing the operating voltages are standard ones.

The antennas 20 and 24 may also be replaced by a single transmission/reception antenna associated with a duplexer and an appropriate processing device.

An advantageous mode of implementation of the present invention consists in the use of two distinct antennas 20 and 24, superimposed (in a pillbox assembly) so as to prevent transmission leaks. The microwave transmitted has a frequency greater than or equal to 30 GHz (millimetric wave) and is preferably equal to 94 GHz.

The antennas 20 and 24 are advantageously parabolic antennas with an azimuthal aperture of 1.5° and an elevation aperture of 10°. They have a gain of about 35 dB and their SWR (standing wave ratio) is in the region of two.

The 10° aperture in elevation enables the detection of nearby obstacles on the ground and also the detection of obstacles that may be suspended over the robot. This elevation aperture is advantageously distributed equally on either side of a plane parallel to the plane of movement of the robot.

Figure 6:
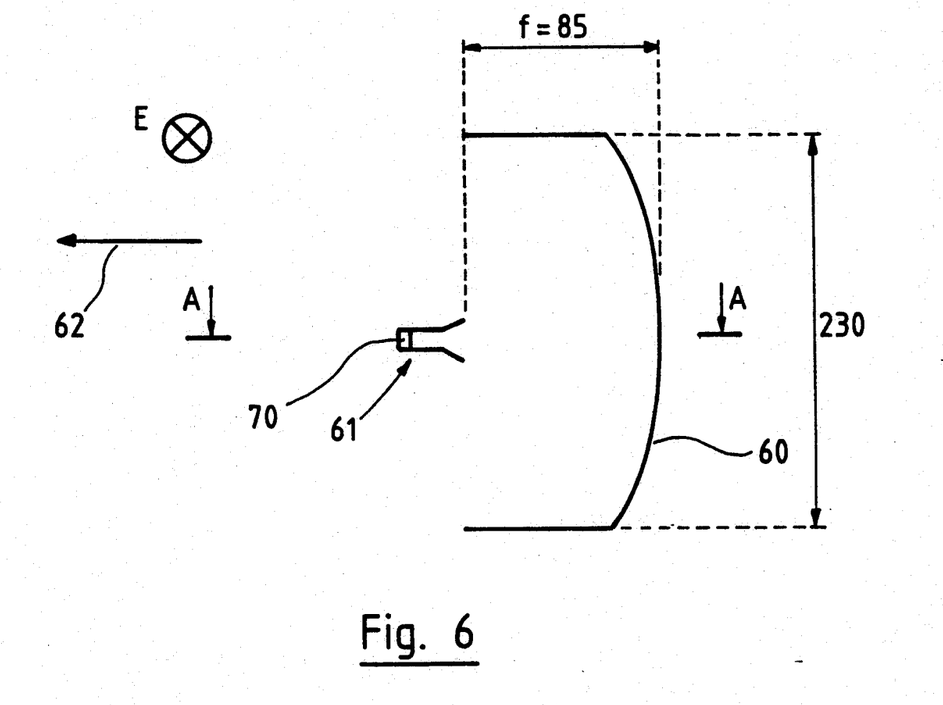
FIG. 6 shows a top view of one of the two antennas mounted in a pillbox assembly, used in the present invention.

FIG. 6 shows a top view of the lower antenna.

The transmission and reception antennas are identical and are formed by a cylindrical reflector 60 illuminated by a horn-type primary source 61 (pillbox antenna). The two antennas radiate in the same direction 62. It may be pointed out, by way of an indication, that their focal length is 85 mm and that their width is 230 mm.

Figure 7:
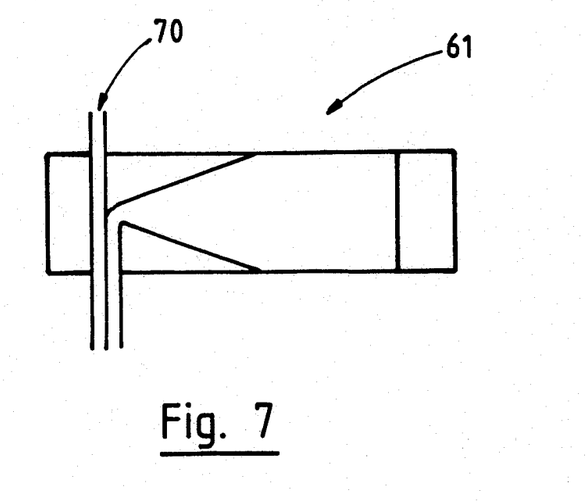
FIG. 7 is an enlarged sectional view of FIG. 6.

FIG. 7 shows an enlarged sectional view along AA of FIG. 6.

The lower antenna 61 is placed immediately beneath the upper antenna (not shown). To supply the upper antenna, a waveguide 70 crosses the lower antenna 61 vertically. The waveguide 70 is masked by the horn of the antenna 61 and therefore does not disturb the radiation pattern of the lower antenna 61.

The radar may be fixed either to a plane located as high as possible on the robot or at the end of a telescopic arm that can be unfolded heightwise to improve the view of the ground at long distance. Since the power sent back by the ground decreases with the flatness or glancing nature of the angle of sight, it would be practical to place the antenna in as high a position as possible.

The onboard part is advantageously placed on a plate rotating azimuthally on the robot, the plate being driven by a motor. An optical encoder makes it possible to know the exact angular position of the plate. This optical encoder is connected to the data bus 33 of the module 5. According to the invention, the onboard part rotates azimuthally at the speed of 0.1 rotation per second. The radar therefore makes a full rotation in ten seconds. Advantageously, the robot makes one observation of its environment for each degree of rotation, i.e. 360 measurements are made every ten seconds. Each antenna rotation is memorized in the RAM 27 before being sent to the extra-vehicular part, for example by radio link.

Since the azimuthal aperture of the antenna is 1.5°, there is a partial overlapping of the data recorded. This partial overlapping makes it possible, in particular, to prevent any deviation of the data transmitted, for example due to a relative positioning of the antennas that is not sufficiently precise with respect to their previous position.

Given that the encoding module 4 samples the data elements coming from the gain correction means 34 at 1 MHz and encodes these data elements on 12 bits, the memory capacity of the RAM 27 should be 2 Mbits ($=360° \times 512 \times 12$ bits) for an antenna rotation. The management module 5 of the onboard part triggers the start of the recording of a recurrence as soon as the microprocessor 30 detects a one-degree incrementation of the optical encoder. Each recurrence has a duration of 512 μs. This incrementation also prompts the transmission of a frequency ramp. The management module 5 also provides for the transfer of the radar data stored in the RAM 27 from the onboard part to the extravehicular part through the ACIA 31.

The device according to the invention advantageously has gain correction means 34, acting as TCG (time-controlled gain) means. Gain correction means 34 such as these enable the radar to make simultaneous displays of echoes at very short distances (some meters) and of echoes at large distances for this type of radar (500 m or more).

In a pulse radar, unlike in the case of a continuous radar of the type used in the invention, the near echoes and the distant echoes are temporally separated because of the propagation time of the microwave pulses. For the echoes coming from the near obstacles to have the same amplitude as the echoes coming from the distant obstacles, it is necessary to reduce the gain at the start of the reception period in order to reduce the dynamic range of the echoes received. The value of the gain during the reception period varies continuously as a function of time to compensate as efficiently as possible for the effect of the variation in power of the echoes received, varying with $D^{-4}$ and of the principle of the illumination of the antenna in elevation.

By contrast, it is not possible to use such means in a continuous radar of the type used in the invention, since the echoes are all present simultaneously in the receiver, irrespectively of their distance. A variation in gain of the receiver during the reception period is therefore not efficient in reducing the dynamic range of the echoes received.

According to the invention, the gain correction circuit 34 providing for a variation of gain in time use the fact that, after the mixing of the signal received and of the signal transmitted, the resultant beat frequency is originally zero and proportional to the distance of the obstacle.

According to a first embodiment, the gain correction circuit 34 for the reduction of the dynamic range correspond to a single-cancellation filter, i.e. they fulfil the same function in analog mode as a single-cancellation filter in digital mode. A filter such as this carries out the following operation, from one sample to the other in the same recurrence:

$$s_n = e_{n-1} - e_n$$

where:
  $s_n$ is the output value
  $e_n$ is the input value of the sample
  $e_{n-1}$ is the value of the previous sample This type of filter is known in the field of Doppler radars where it is used to eliminate the fixed echoes, namely the zero or almost zero Doppler frequency echoes, generally constituted by the ground echoes. By analogy, it is used herein in the case of a continuous (FM-CW) radar to attenuate the zero beat frequencies corresponding to the near distances.

In a Doppler radar, the filter processes samples located in a same stretch of distance, but in successive recurrences. According to the invention, it takes account of the successive samples of one and the same recurrence, i.e. the reception antenna receives several information elements for each of its positions.

The following mathematical operations illustrate the working of the single-cancellation filter used according to one embodiment of the invention.

In considering the starting point of the periods to be the instant of transmission of the start of the frequency ramp, the signal s(t) coming from the filter at the instant t may be considered to be a function of two variables n and α:

$$s(t) = s_n(\alpha), \text{avec } t = (n+\alpha) \cdot t_e$$

where:
  $t_e$ is the sampling period (1 μs) of the analog/digital converter 26;
  n is a whole number varying between 0 and N−1
  N is the number of signal samples taken into account by recurrence (N=512)
  α is a real number included in the interval [0,1[

The single-cancellation filter then carries out the following operation:

$$\begin{aligned} s_n(\alpha) &= e_{n-1}(\alpha) - e_n(\alpha) \\ &= A\cos[2\pi f_b(n+1+\alpha)t_e + \Phi_0] - \\ &\quad A\cos[2\pi f_b(n+\alpha)t_e + \Phi_0] \\ &= 2A\sin(\pi f_b t_e) \cdot \sin[2\pi(n+\alpha)f_b t_e + \pi f_b t_e + \Phi_0] \end{aligned}$$

where:
  $f_b$ is the beat frequency ranging from 0 to $f_e/2$
  $f_e$ is the sampling frequency $= 1/t_e$
  $\Phi_0$ is the initial phase and may have any value
  A is the amplitude of the signal
It is observed that $s_n(\alpha)$ is the product of two terms:
  $2\sin(\pi f_b t_e)$ which depends only on the distance of the obstacle $$A \sin[2\pi(n+\alpha)f_b t_e + \pi f_b t_e + \Phi_0]$$

which is a sinusoidal signal varying as a function of the index n. Its mean power is equal to $A^2/2$.

A signal with a power of $A^2/2$ before the filter will have, at output of the filter, a power value equal to:

$$2A^2 \sin^2 \rho f_b t_e$$

This value determines the limit values of the filter to be used to distinguish the near echoes from the distant echoes.

Figure 4:
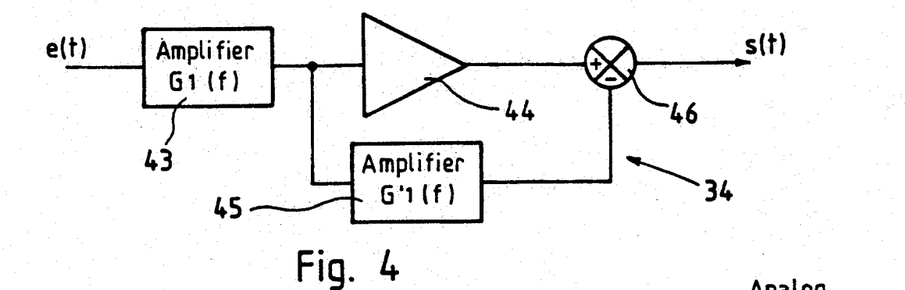
FIG. 4 shows the gain correction means used in the present invention, corresponding to a single-cancellation filter.

FIG. 4 shows the gain correction means used in the present invention, corresponding to a single-cancellation filter.

The signal e(t) is the one coming from the video amplifier 25 (FIG. 2). This signal is injected into a module 43 with a gain $G_1$ (f). The output signal from the module 43 is given to an amplifier 44 and to a second module 45 with a gain $G'_1$ (f). The amplified signal coming out of the module 45 is subtracted from the signal coming from the amplifier 44 by a subtractor 46, and thus the output signal s(t).

The modules 43 and 45 have gains that are a function of the frequency of the signal s(t) and correspond to the limit values of the filter used.

According to a second embodiment of the invention, the filter used is a double-cancellation filter performing the following operation:

$$s_n = e_{n-2} - 2e_{n-1} + e_n$$

This embodiment constitutes a preferred embodiment of the invention, for the reasons explained further below with reference to FIG. 3.

It is also possible to carry out an a posteriori gain correction, after the processing by FFT, once the echoes have been separated in terms of distance. This processing operation improves the quality of the radar map but prevents neither the saturation of the analog/digital converter 26 (FIG. 2) caused by the fact that the level of the signal received is too high, nor a masking phenomenon. For, when an FFT is carried out, minor lobes are introduced and the echoes coming from near obstacles will have a higher level than the echoes coming from distant obstacles. The weak echoes, coming from distant obstacles, are then masked by the minor lobes of the powerful echoes at output of the FFT operation.

Figure 5:
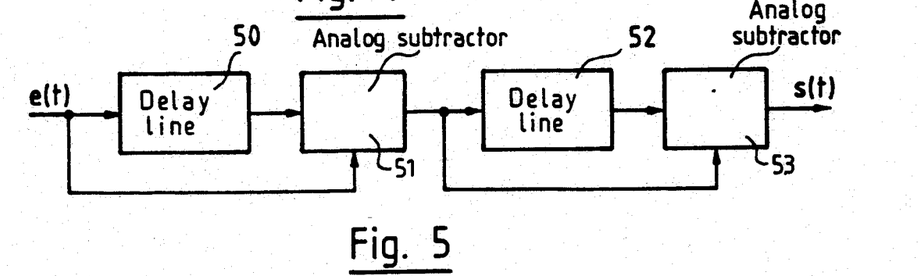
FIG. 5 is a block diagram of the gain correction means used in the present invention.

FIG. 5 is a block diagram of the gain correction means used in the present invention.

As specified here above, the principle of the single or double cancellation filters is used to compensate for the attenuations due to the transmission medium. FIG. 5 shows the principle of a double cancellation filter made in analog form.

An analog signal e(t) is sent into a circuit 50 constituted by a delay line with a passband $f_{bmax}$ (500 kHz) and prompting a delay with a duration of $t_e$ (1 μs). The output of the delay line has a data element $e(t-t_e)$. A delay line such as this may be of the "distributed constants" type, i.e. one formed by the series connection of LC type passive circuits. The output and input of the delay line 50 are connected to the two inputs of an analog subtractor 51. The output of the subtractor 51 therefore has a data element $e(t-t_e) - e(t)$.

It must be pointed out that the circuit described up till now is that of a single cancellation filter since the output of the substractor 51 is equal to $e(t-t_e) - e(t)$.

The output signal of the subtractor 51 is admitted into a second unit formed by the delay line 52 and the subtractor 53. The signal s(t) coming out of the subtractor 53 is equal to; $s(t) = e(t-2t_e) - 2e(t-t_e) + e(t)$.

In attenuating the near echoes, the single or double cancellation filter also eliminates the transmission leakage. The transmission leakage is the signal received directly by the reception antenna, owing to poor decoupling between the two antennas.

However, a filter such as this has no effect of reducing the noise borne by the transmission, since a noise is characterized by a very extensive frequency spectrum. The sensitivity of the receiver remains limited by the level of the noise arriving by the transmission leakage. It is necessary, of course, to dimension the decoupling of the antennas and the spectral purity of the transmission in such a way that this noise is reduced to below the thermal noise of the receiver.

Figure 3:
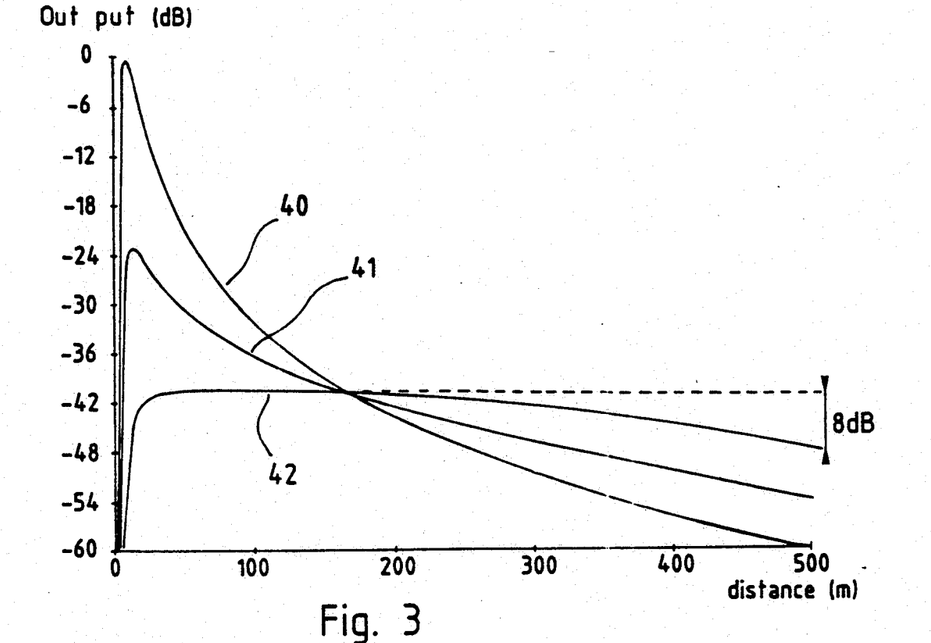
FIG. 3 represents the variation in power admitted into the reception means of the device as a function of the distance of the detected obstacle and for three different embodiments of the invention.

FIG. 3 shows the value of the power entering the analog/digital converter of the invention as a function of the distance of an echo, according to three configurations of the invention.

The three curves 40, 41 and 42 shown are in a reference system, the x-axis of which is graduated in meters (the distance from which the echoes come) and the y-axis in dB.

The curve 40 represents the power received without filtering means. It is observed that the power received is far greater for a near obstacle than for a far obstacle. This curve 40 has a shape varying with $D^{-4}$.

The curve 41 represents the power received with a filter corresponding to a single cancellation filter, of the type shown in FIG. 4. For near obstacles, this power is already considerably smaller than in the case of the curve 40, and a smaller dynamic range is therefore observed.

The curve 42 represents the power received with a filter corresponding to a double cancellation filter. The response is very flat for distances of 10 to 500 meters, the residual dynamic range related to the variation in distance being 8 dB instead of:

$$40 \log(500/10) = 68 \text{ dB}$$

For filter limit values (according to $D^4$) such as these, the response curve is therefore far better than for filter limit values giving a response curve such as the curve 41.

It must be noted that the computations that have enabled these three curves to be plotted take account of the antenna gain as a function of the observation site. The following specifications have been met: 10° elevation angle aperture of the antenna and antenna placed at a height of one meter from the ground.

The filtering done makes it possible to increase the range of the device according to the invention, in avoiding both the saturation of the analog/digital converter and the appearance of a phenomenon of masking of the distant echoes.

The extra-vehicular part carries out the processing of the radar signal as well as the processing of the radar image used for the navigation of the mobile robot.

This extra-vehicular part is constituted, according to the invention, by a rack comprising several processing cards:

a central unit UNIX + hard disk + diskette reader
an FFT card
a control card two memory cards to store the radar video a graphic card a color console enabling the display of the recurrences and dialog with the system a keyboard specific to the application.

Since the wave transmitted is linearly modulated in frequency, a processing by demodulation of a recurrence by its replica followed by an FFT on the entire recurrence makes it possible to obtain an echo at a frequency proportional to the delay of this echo. The result is then memorized to constitute the radar image.

The processing means thus deliver maps of the environment in which the robot is placed in giving, for each point of the environment observed, a signal with a level that is representative of the radar equivalent surface of the terrain or objects located at this point. On the basis of this radar image, the user may guide the robot so that it avoids obstacles appearing in the image and/or so that it moves towards a precise goal. The guidance can also be done by radio link, on a channel different from that used to transmit data from the onboard part to the part placed at a distance.

Naturally, the guidance can also be done differently, for example by optical links.

The data elements transferred by the onboard part correspond to a distance and to an azimuthal angle (polar data elements, 2D reference system) or to three dimensions (distance, azimuthal angle, elevation angle) and are processed by the extra-vehicular part to be converted into orthogonal data elements.

According to the invention, the resolution in distance of the radar is independent of the distance at which an obstacle is detected, so much so that the blind distance of the radar is equal to the resolution. For a modulation bandwidth of 75 MHz, the blind distance is therefore equal to two meters. This small blind distance enables high precision steering of the robot. Furthermore, since the image of the environment is updated every ten seconds, the user has new data available very quickly, enabling him to predict the movement commands that he will send the robot.

According to another embodiment of the present invention, the processing of the data by the extra-vehicular part enables the self-guidance of the robot. The robot itself avoids the obstacles that the radar has detected. The user no longer has any guiding to do, but has only to give the robot data corresponding to the goal to be reached.

Another characteristic of the present invention is that the continuous waveform has a mean power equal to the peak power, thus making it possible to work with low power compatible with high performance characteristics. Thus, the maximum distance of detection of an obstacle is of the order of 500 m (with a resolution in distance of 2 m).

The fact of placing the data processing operations relating to the environment of the robot at a distance enables the use of powerful image processing algorithms.

The invention proposes notably the use of a resetting algorithm enabling each image to be repositioned with respect to an image which, for example, has been recorded beforehand. A resetting algorithm can be split up into several modules:

pre-processing (obtaining of the image);

segmentation (contours, regions . . . )

extraction of primitives and associated attributes;

matching estimation of the parameters of the deformation model making the images to be reset coincide The correspondence between the radar image received and the reference image is obtained after specific processing operations. The reference image is put into a form compatible with the radar image and does not depend on the nature of the source (IGN type card, radar card etc.). It should comply in distance and angular resolution and in angle of sight.

Each image may be described at several levels:

primitive at the level of the point (low level)

primitive at the level of the contours primitive at the level of the regions primitive at the combined line/region level primitive at the level of the neighborhoods primitive at the level of the graph (high level).

To each level of description there respectively corresponds a set of resetting methods:

resetting by correlation (measurement of the distance between two images: "normal" correlation, simplified correlation, phase (fast Fourier transform) correlation, "shapes" correlation, statistical correlation etc.)

resetting by probabilistic relaxation (labelling of objects on the basis of initial probabilities updated by constraints proper to the problem);

resetting by prediction and verification of hypotheses (local predictions, overall checking)

resetting by dynamic programming (this is more elastic than the correlation as local differences are tolerated, just as in the search for an optimal path in a graph constituted by the coordinates of the remaining points of the maps after extraction of contours and threshold);

resetting by association graph (matching of the structural descriptions)

resetting by the matching of the contours (point by point after convolution and thresholding, segment by segment after polygonal approximation of the contour, circle arc by circle arc after curvilinear approximation).

The use of image processing algorithms makes it possible to carry out the above-described positioning function. This function naturally makes it necessary for the environment in which the robot moves to be shown on a map or for it to have been previously recorded, so that the processing device may recognize the environment of the robot.

The present invention preferably uses a processing algorithm enabling a resetting on the basis of primitives of a relatively high level (detection of contours, thresholding, linearization of the segments).

The millimetric radar for the guidance of the robot on the ground combines both the compactness and lightness needed for it to be set on the mobile vehicle and the computing power needed for the processing of the radar signal and for the guidance and positioning computations.

The performance characteristics of the radar depend little on weather and environmental conditions (rain, dense fog, night, thick smoke, etc.) so much so that it constitutes an all-weather radar. The range of frequency used by the radar corresponds to a window in the atmospheric absorption curve. The low value of the wavelength gives the radar of the invention a high angular resolution making it possible to distinguish small-sized objects while at the same time preserving compactness. It occupies a moderate amount of space and a good response of the echoes in millimetric waves is obtained.

The millimetric radar according to the invention is particularly intended for sites that are inaccessible to human beings or dangerous to their health. It can be applied notably in sensitive sites (such as nuclear power plants, factories handling toxic materials, clean rooms etc.), or else in terrains encumbered with obstacles such as battlefields for the remote control of attacking vehicles, for mine clearance or, again, for fire-fighting operations.

The robot is advantageously an all-terrain vehicle fitted out with wheels and/or tracks. It may be fitted out with measurement means, for example to measure radioactivity and/or means used to grasp objects (such as telescopic arms with clamps, mechanical shovels etc.).

What is claimed is:

1. A device for the detection of the environment, and the positioning and/or guidance of a mobile vehicle on the ground, of the type comprising, firstly, means for the generation and transmission of a signal in frequency modulated continuous millimetric waves that can be reflected by a fixed obstacle and, secondly, signal reception means for receiving said reflected waves and signal processing means for processing said reflected waves, said reception means comprising gain correction means enabling the simultaneous detection of nearby obstacles and distant obstacles; said gain correction means are analog means placed upline from the signal processing means; said signal processing means are digital being located downline from a sampler performing an analog/digital conversion: said gain correction means comprising a first subtractor receiving, firstly, a signal coming from said reception means and, secondly, this same signal delayed by a period of time equal to the sampling period of said analog/digital converter, a second subtractor receiving, firstly, the ouput signal from said first subtractor and, secondly, this same signal delayed by a time equal to said sampling period of said analog/digital converter, the output of said second subtractor supplying said analog/digital converter.

2. A device according to claim 1, wherein the transmission and reception means transmit or receive their signal by means of a rotary antennas with a 360° azimuthal rotation.

3. A device according to claim 2, wherein the rotary antenna device is constituted by two antennas, with an aperture in elevation of about 10°.

4. A device according to claim 3, wherein the rotary antenna device is constituted by two antennas, with an aperture in azimuth of about 1.5°.

5. A device according to claim 3, wherein said antennas are of the pillbox type, fixed one on top of the other to prevent transmission leakages.

6. A device according to claim 4, wherein said antennas are of the pillbox type, fixed one on top of the other to prevent transmission leakages.

7. A device according to claim 2, wherein said rotary antenna device is fixed on a plane located as high as possible on said autonomous mobile vehicle, notably on a telescopic arm.

8. A device according to claim 1, wherein said processing means are extra-vehicular, namely placed at a distance from said mobile vehicle, and communicate with said vehicle by radio link.

9. A device according to claim 1, wherein said reflected signal is memorized and transmitted to said processing means after each complete revolution of said rotary antenna device.

10. A device according to claim 1, wherein said processing means use image processing algorithms that deliver maps of the environment in which the autonomous mobile vehicle is located in giving a signal for each point of the environment observed, the level of this signal representing the radar equivalent surface of the terrain or of the objects located at this point 11. A device according to claim 8, wherein said processing means use image processing algorithms that deliver maps of the environment in which the autonomous mobile vehicle is located in giving a signal for each point of the environment observed, the level of this signal representing the radar equivalent surface of the terrain or of the objects located at this point.

12. A device according to claim 9, wherein said processing means use image processing algorithms that deliver maps of the environment in which the autonomous mobile vehicle is located in giving a signal for each point of the environment observed, the level of this signal representing the radar equivalent surface of the terrain or of the objects located at this point.

13. A device according to claim 11, wherein said image processing algorithms enable the display of the data elements coming from said autonomous mobile vehicle on a display screen in the form of a 2D or 3D scene.

14. A device according to claim 12, wherein said image processing algorithms enable the display of the data elements coming from said autonomous mobile vehicle on a display screen in the form of a 2D or 3D scene.

15. A device according to claim 14, wherein said image processing algorithms carry out a resetting of the image transmitted by said autonomous mobile vehicle with a previously recorded image or with a geographical map.

16. A device according to claim 1, wherein said autonomous mobile vehicle is remote controlled by radio link.

17. A device according to claim 1, wherein said autonomous mobile ground vehicle is an all-terrain robot fitted out with wheels and/or tracks.

* * * * *